United States Patent
Jiang et al.

(10) Patent No.: US 10,282,420 B2
(45) Date of Patent: May 7, 2019

(54) EVALUATION ELEMENT RECOGNITION METHOD, EVALUATION ELEMENT RECOGNITION APPARATUS, AND EVALUATION ELEMENT RECOGNITION SYSTEM

(71) Applicants: Shanshan Jiang, Beijing (CN); Bin Dong, Beijing (CN); Jichuan Zheng, Beijing (CN); Jiashi Zhang, Beijing (CN); Yixuan Tong, Beijing (CN)

(72) Inventors: Shanshan Jiang, Beijing (CN); Bin Dong, Beijing (CN); Jichuan Zheng, Beijing (CN); Jiashi Zhang, Beijing (CN); Yixuan Tong, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 52 days.

(21) Appl. No.: 15/597,501

(22) Filed: May 17, 2017

(65) Prior Publication Data
US 2017/0337182 A1    Nov. 23, 2017

(30) Foreign Application Priority Data
May 23, 2016    (CN) .......................... 2016 1 0346263

(51) Int. Cl.
*G06F 17/27*  (2006.01)
*G06F 17/28*  (2006.01)

(52) U.S. Cl.
CPC ...... *G06F 17/2785* (2013.01); *G06F 17/2765* (2013.01); *G06F 17/2818* (2013.01)

(58) Field of Classification Search
None
See application file for complete search history.

(56) References Cited

U.S. PATENT DOCUMENTS

2011/0314003 A1   12/2011  Ju et al.
2013/0259374 A1*  10/2013  He ........................... G06K 9/34
                                                                  382/173

OTHER PUBLICATIONS

Fei Zhu, Bairong Shen; Combined SVM-CRFs for Biological Named Entity Recognition with Maximal Bidirectional Squeezing; Jun. 26, 2012; Pages: all URL: https://journals.plos.org/plosone/article?id=10.1371/journal.pone.0039230.*

* cited by examiner

*Primary Examiner* — Richa Mishra
(74) *Attorney, Agent, or Firm* — IPUSA, PLLC

(57) ABSTRACT

A method, an apparatus and a system for recognizing an evaluation element are provided. The method includes receiving an input text; performing, using a first conditional random field model, first recognition for the input text to obtain a first recognition result, the first recognition result including a pre-evaluation element that is recognized by using the first conditional random field model; performing, using a second conditional random field model, second recognition for the input text to obtain a second recognition result, the second recognition result including a false positive evaluation element that is recognized by using the second conditional random field model, the false positive evaluation element being an element erroneously detected as an evaluation element; and recognizing, based on the first recognition result and the second recognition result, an evaluation element in the input text.

10 Claims, 4 Drawing Sheets

EVALUATION ELEMENT RECOGNITION METHOD, EVALUATION ELEMENT RECOGNITION APPARATUS, AND EVALUATION ELEMENT RECOGNITION SYSTEM

CROSS-REFERENCE TO RELATED APPLICATIONS

The present application claims priority under 35 U.S.C. § 119 to Chinese Application No. 201610346263.7 filed on May 23, 2016, the entire contents of which are incorporated herein by reference.

BACKGROUND OF THE INVENTION

1. Field of the Invention

The present invention relates to the field of natural language processing, and specifically, an evaluation element recognition method, an evaluation element recognition apparatus, and an evaluation element recognition system.

2. Description of the Related Art

Evaluation of a product by a user is generally expressed by a text; thus, in order to better understand and analyze an opinion in an evaluation text, opinion mining of an evaluation element becomes a main topic in the field of evaluation analysis. The opinion mining of a evaluation element mainly includes two steps, i.e., extraction of an evaluation element, and determination of emotional tendency corresponding to the evaluation element. The evaluation element may be an evaluated object or a feature of an object. For example, in the field of products of mobile phones, "mobile phone" and "screen" may be evaluation elements.

In the field of evaluation analysis, extraction of an evaluation element is generally regarded as a task of recognizing a named entity, and is performed by using a conditional random field model of a determination model. Similarly as other information extraction tasks, evaluation criteria of extraction of an evaluation element are a precision rate and a recall rate. The precision rate is a ratio of the number of samples correctly judged as a class by a conditional random field model to the total number of samples judged as the class by the conditional random field model, and expresses a degree of precision of a recognition result of a conditional random field model. The recall rate is a ratio of the number of samples correctly judged as a class by a conditional random field model to the total number of samples belonging to the class, and expresses completeness of a recognition result of a conditional random field model.

An increase of a precision rate will lead to a decrease of false positive results; and in the conventional technology, a precision rate is usually increased by optimizing a feature in an application of a conditional random field model.

However, the effect of simply optimizing a feature of a conditional random field model is not good, because an element word is not always an evaluation element. For example, in a case where a user wrote a review "an XX screen of a mobile phone is very good and powerful", the "XX screen" is an evaluation element. However, in a case where "a powerful high-resolution XX screen is used in a mobile phone" occurred in an article advertisement, the "XX screen" is not an evaluation element because there is no opinion in this sentence. For the above case, it is difficult to find a scheme for increasing a precision rate of a recognition result of a conditional random field model.

SUMMARY OF THE INVENTION

According to a first aspect of the present invention, an evaluation element recognition method may include receiving an input text; performing, using a first conditional random field model, first recognition for the input text to obtain a first recognition result, the first recognition result including a pre-evaluation element that is recognized by using the first conditional random field model; performing, using a second conditional random field model, second recognition for the input text to obtain a second recognition result, the second recognition result including a false positive evaluation element that is recognized by using the second conditional random field model, the false positive evaluation element being an element erroneously detected as an evaluation element; and recognizing, based on the first recognition result and the second recognition result, an evaluation element in the input text.

In the first aspect of the present invention, before performing the first recognition for the input text using the first conditional random field model, the evaluation element recognition method may further include obtaining a plurality of sets of first training data, each set of the first training data including a text and an evaluation element labeled in the text; generating a feature of the first conditional random field model; and estimating, using the plurality of sets of first training data, a weight of the feature of the first conditional random field model, and generating, based on the estimated weight, the first conditional random field model.

In the first aspect of the present invention, the feature of the first conditional random field model may be a word-level feature.

In the first aspect of the present invention, before performing the second recognition for the input text using the second conditional random field model, the evaluation element recognition method may further include obtaining a plurality of sets of second training data, each set of the second training data including a text and a false positive evaluation element labeled in the text; generating a feature of the second conditional random field model; and estimating, using the plurality of sets of second training data, a weight of the feature of the second conditional random field model, and generating, based on the estimated weight, the second conditional random field model.

In the first aspect of the present invention, the feature of the second conditional random field model may be a sentence-level feature.

In the first aspect of the present invention, recognizing the evaluation element in the input text based on the first recognition result and the second recognition result may include determining that the pre-evaluation element is an evaluation element, when the pre-evaluation element is not the false positive evaluation element.

In the first aspect of the present invention, the first recognition result may further include a marginal probability p1 of the pre-evaluation element that is recognized by using the first conditional random field model, and the second recognition result may further include a marginal probability p2 of the false positive evaluation element that is recognized by using the second conditional random field model, and recognizing the evaluation element in the input text based on the first recognition result and the second recognition result may include determining that the pre-evaluation element is an evaluation element, when a ratio between p1 and p2 is greater than a predetermined threshold, and determining that the pre-evaluation element is not an evaluation element, when the ratio between p1 and p2 is not greater than the predetermined threshold.

According to a second aspect of the present invention, an evaluation element recognition apparatus may include a memory storing computer-readable instructions; and one or more processors configured to execute the computer-readable instructions such that the one or more processors are configured to receive an input text; perform, using a first conditional random field model, first recognition for the input text to obtain a first recognition result, the first recognition result including a pre-evaluation element that is recognized by using the first conditional random field model; perform, using a second conditional random field model, second recognition for the input text to obtain a second recognition result, the second recognition result including a false positive evaluation element that is recognized by using the second conditional random field model, the false positive evaluation element being an element erroneously detected as an evaluation element; and recognize, based on the first recognition result and the second recognition result, an evaluation element in the input text.

In the second aspect of the present invention, before performing the first recognition for the input text using the first conditional random field model, the one or more processors may be further configured to obtain a plurality of sets of first training data, each set of the first training data including a text and an evaluation element labeled in the text; generate a feature of the first conditional random field model; and estimate, using the plurality of sets of first training data, a weight of the feature of the first conditional random field model, and generating, based on the estimated weight, the first conditional random field model.

In the second aspect of the present invention, before performing the second recognition for the input text using the second conditional random field model, the one or more processors may be further configured to obtain a plurality of sets of second training data, each set of the second training data including a text and a false positive evaluation element labeled in the text; generate a feature of the second conditional random field model; and estimate, using the plurality of sets of second training data, a weight of the feature of the second conditional random field model, and generating, based on the estimated weight, the second conditional random field model.

According to a third aspect of the present invention, an evaluation element recognition system may include an input apparatus configured to receive an input text; an analyzing apparatus; and an output apparatus configured to output a recognition result of the analyzing apparatus, wherein the analyzing apparatus includes a memory storing computer-readable instructions; and one or more processors configured to execute the computer-readable instructions such that the one or more processors are configured to perform, using a first conditional random field model, first recognition for the input text to obtain a first recognition result, the first recognition result including a pre-evaluation element that is recognized by using the first conditional random field model; perform, using a second conditional random field model, second recognition for the input text to obtain a second recognition result, the second recognition result including a false positive evaluation element that is recognized by using the second conditional random field model, the false positive evaluation element being an element erroneously detected as an evaluation element; and recognize, based on the first recognition result and the second recognition result, an evaluation element in the input text.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention.

In view of the problem of a low precision rate of evaluation element recognition in the conventional technology, embodiments of the present invention have an object to provide a method, an apparatus, and a system for recognizing an evaluation element that can accurately recognize an evaluation element in a text.

First Embodiment

Figure 1:
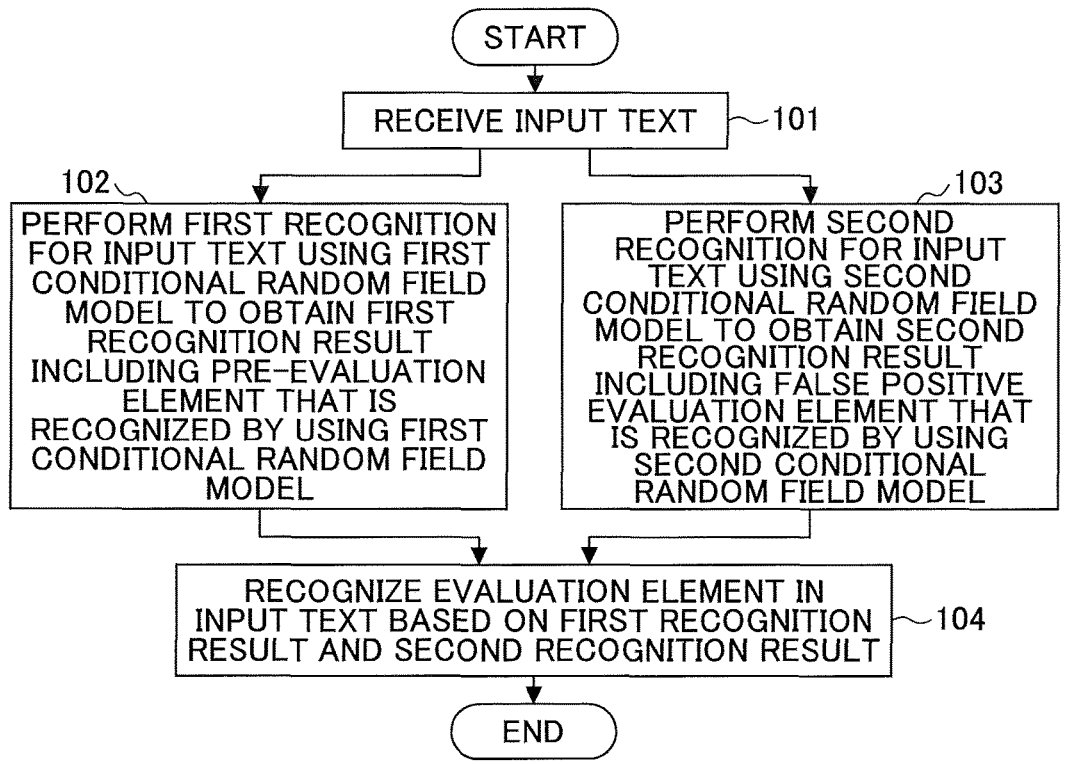
FIG. 1 is a flowchart illustrating an evaluation element recognition method according to a first embodiment of the present invention.

The present embodiment provides an evaluation element recognition method. As illustrated in FIG. 1, the evaluation element recognition method according to the present invention includes steps 101 to 104.

Step 101: receive an input text.

Step 102: perform first recognition for the input text to obtain a first recognition result using a first conditional random field model. The first recognition result includes a pre-evaluation element that is recognized by using the first conditional random field model.

Step 103: perform second recognition for the input text to obtain a second recognition result using a second conditional random field model. The second recognition result includes a false positive evaluation element that is recognized by using the second conditional random field model. The false positive evaluation element is an element erroneously detected as an evaluation element.

Step 104: recognize an evaluation element in the input text based on the first recognition result and the second recognition result.

In the present embodiment, the first recognition is performed for the input text using the first conditional random field model, and the pre-evaluation element is recognized from the input text. Then, the second recognition is performed for the input text using the second conditional random field model, and the false positive evaluation element is recognized from the input text. And then, the evaluation element in the input text is recognized by determining whether the pre-evaluation element is the evaluation element based on the first recognition result and the second recognition result. According to the embodiment of the present invention, it is possible to analyze a text of a user review, and to recognize the evaluation element in the text.

Furthermore, before performing the first recognition for the input text using the first conditional random field model, the evaluation element recognition method further includes obtaining a plurality of sets of first training data, each set of the first training data including a text and an evaluation element labeled in the text; generating a feature of the first conditional random field model; and estimating, using the plurality of sets of first training data, a weight of the feature of the first conditional random field model, and generating, based on the estimated weight, the first conditional random field model.

Specifically, the first training data may be a text of a user review where the evaluation element has been labeled, and it is better if the number of the first training data is larger. In this way, a first conditional random field model with a higher recognition precision rate can be obtained by performing training using a large amount of the first training data. The method for estimating the weight of the feature of the first conditional random field model includes but is not limited to a maximum likelihood method, a BFGS method, a stochastic gradient descent method, and a Bayes method.

Preferably, the feature of the first conditional random field model is a word-level feature, because the word-level feature has a better indicating effect on subjectivity.

Furthermore, before performing the second recognition for the input text using the second conditional random field model, the evaluation element recognition method further includes obtaining a plurality of sets of second training data, each set of the second training data including a text and a false positive evaluation element labeled in the text; generating a feature of the second conditional random field model; and estimating, using the plurality of sets of second training data, a weight of the feature of the second conditional random field model, and generating, based on the estimated weight, the second conditional random field model.

Specifically, the second training data may be a text of a user review where the false positive evaluation element has been labeled, and it is better if the number of the second training data is larger. In this way, a second conditional random field model with a higher recognition precision rate can be obtained by performing training using a large amount of the second training data. The method for estimating the weight of the feature of the second conditional random field model includes but is not limited to a maximum likelihood method, a BFGS method, a stochastic gradient descent method, and a Bayes method.

Preferably, the feature of the second conditional random field model is a sentence-level feature, because the sentence-level feature has a better indicating effect on objectivity.

Furthermore, recognizing the evaluation element in the input text based on the first recognition result and the second recognition result includes determining that the pre-evaluation element is an evaluation element, when the pre-evaluation element is not the false positive evaluation element.

Furthermore, if it is determined by the first conditional random field model that a word in the input text is a non-evaluation element and it is determined by the second conditional random field model that the word is a non-false positive evaluation element, it may be determined that the word is not an evaluation element. If it is determined by the first conditional random field model that a word in the input text is a non-evaluation element and it is determined by the second conditional random field model that the word is a false positive evaluation element, it may be determined that the word is not an evaluation element.

Furthermore, if it is determined by the first conditional random field model that a word in the input text is a pre-evaluation element and it is determined by the second conditional random field model that the word is a false positive evaluation element, the first recognition result further includes a marginal probability p1 of the pre-evaluation element that is recognized by using the first conditional random field model, and the second recognition result further includes a marginal probability p2 of the false positive evaluation element that is recognized by using the second conditional random field model. Specifically, the method of recognizing the evaluation element in the input text based on the first recognition result and the second recognition result is as follows.

It is determined that the pre-evaluation element is an evaluation element, when a ratio between p1 and p2 is greater than a predetermined threshold, and it is determined that the pre-evaluation element is not an evaluation element, when the ratio between p1 and p2 is not greater than the predetermined threshold.

Specifically, the ratio between p1 and p2 may be calculated based on $\log_a p1 - \log_a p2$. Here, the value range of a may be 2 to 10, the value of a may also be another natural number greater than 1, and the value of the predetermined threshold may be set according to an actual situation.

Second Embodiment

Figure 2:
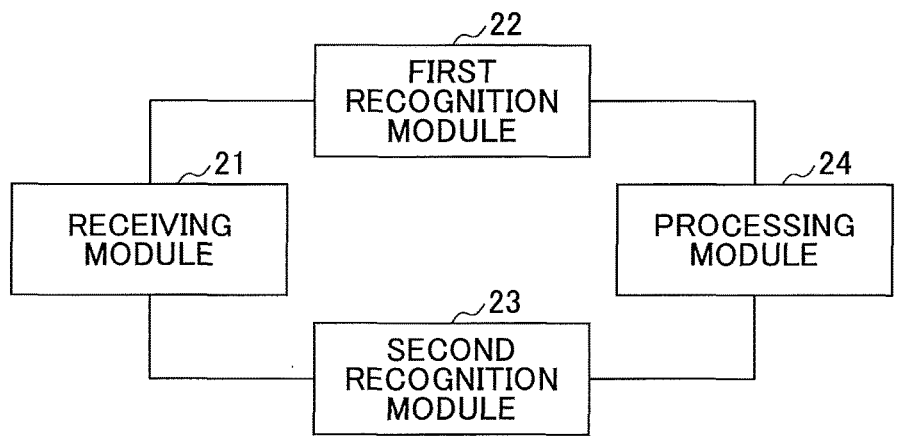
FIG. 2 is a schematic block diagram illustrating an evaluation element recognition apparatus according to a second embodiment of the present invention.

The present embodiment further provides an evaluation element recognition apparatus. As illustrated in FIG. 2, the evaluation element recognition apparatus according to the present embodiment includes a receiving module 21, a first recognition module 22, a second recognition module 23, and a processing module 24.

The receiving module 21 receives an input text.

The first recognition module 22 performs first recognition for the input text to obtain a first recognition result using a first conditional random field model. The first recognition result includes a pre-evaluation element that is recognized by using the first conditional random field model.

The second recognition module 23 performs second recognition for the input text to obtain a second recognition result using a second conditional random field model. The second recognition result includes a false positive evaluation element that is recognized by using the second conditional random field model. The false positive evaluation element is an element erroneously detected as an evaluation element.

The processing module 24 recognizes an evaluation element in the input text based on the first recognition result and the second recognition result.

In the present embodiment, the first recognition is performed for the input text using the first conditional random field model, and the pre-evaluation element is recognized from the input text. Then, the second recognition is performed for the input text using the second conditional random field model, and the false positive evaluation element is recognized from the input text. And then, the evaluation element in the input text is recognized by determining whether the pre-evaluation element is the evaluation element based on the first recognition result and the second recognition result. According to the embodiment of the present invention, it is possible to analyze a text of a user review, and to recognize the evaluation element in the text.

Furthermore, the evaluation element recognition apparatus further includes a first obtaining module and a first generating module.

The first obtaining module obtains a plurality of sets of first training data. Each set of the first training data include a text and an evaluation element labeled in the text.

The first generating module generates a feature of the first conditional random field model, estimates a weight of the feature of the first conditional random field model using the plurality of sets of first training data, and generates the first conditional random field model based on the estimated weight.

Specifically, the first training data may be a text of a user review where the evaluation element has been labeled, and it is better if the number of the first training data is larger. In this way, a first conditional random field model with a higher recognition precision rate can be obtained by performing training using a large amount of the first training data. The method for estimating the weight of the feature of the first conditional random field model includes but is not limited to a maximum likelihood method, a BFGS method, a stochastic gradient descent method, and a Bayes method.

Preferably, the feature of the first conditional random field model is a word-level feature, because the word-level feature has a better indicating effect on subjectivity.

Furthermore, the evaluation element recognition apparatus further includes a second obtaining module and a second generating module.

The second obtaining module obtains a plurality of sets of second training data. Each set of the second training data include a text and a false positive evaluation element labeled in the text.

The second generating module generates a feature of the second conditional random field model, estimates a weight of the feature of the second conditional random field model using the plurality of sets of second training data, and generates the second conditional random field model based on the estimated weight.

Specifically, the second training data may be a text of a user review where the false positive evaluation element has been labeled, and it is better if the number of the second training data is larger. In this way, a second conditional random field model with a higher recognition precision rate can be obtained by performing training using a large amount of the second training data. The method for estimating the weight of the feature of the second conditional random field model includes but is not limited to a maximum likelihood method, a BFGS method, a stochastic gradient descent method, and a Bayes method.

Preferably, the feature of the second conditional random field model is a sentence-level feature, because the sentence-level feature has a better indicating effect on objectivity.

Furthermore, the processing module 24 determines that the pre-evaluation element is an evaluation element, when the pre-evaluation element is not the false positive evaluation element.

Furthermore, if it is determined by the first conditional random field model that a word in the input text is a non-evaluation element and it is determined by the second conditional random field model that the word is a non-false positive evaluation element, it may be determined that the word is not an evaluation element. If it is determined by the first conditional random field model that a word in the input text is a non-evaluation element and it is determined by the second conditional random field model that the word is a false positive evaluation element, it may be determined that the word is not an evaluation element.

Furthermore, if it is determined by the first conditional random field model that a word in the input text is a pre-evaluation element and it is determined by the second conditional random field model that the word is a false positive evaluation element, the first recognition result further includes a marginal probability p1 of the pre-evaluation element that is recognized by using the first conditional random field model, and the second recognition result further includes a marginal probability p2 of the false positive evaluation element that is recognized by using the second conditional random field model.

Specifically, the processing module 24 determines that the pre-evaluation element is an evaluation element, when a ratio between p1 and p2 is greater than a predetermined threshold, and determines that the pre-evaluation element is not an evaluation element, when the ratio between p1 and p2 is not greater than the predetermined threshold.

Specifically, the ratio between p1 and p2 may be calculated based on $\log_a p1 - \log_a p2$. Here, the value range of a may be 2 to 10, the value of a may also be another natural number greater than 1, and the value of the predetermined threshold may be set according to an actual situation.

Third Embodiment

Figure 3:
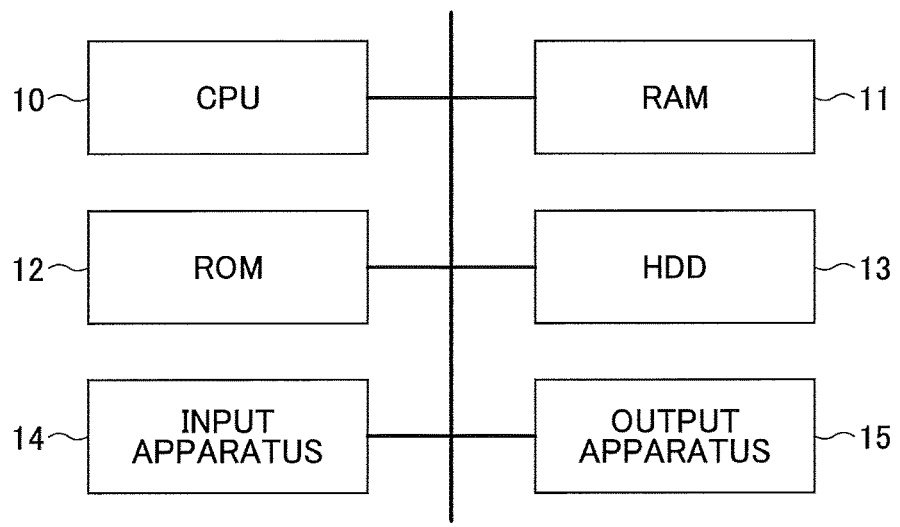
FIG. 3 is a schematic block diagram illustrating an evaluation element recognition system according to a third embodiment of the present invention.

The present embodiment further provides an evaluation element recognition system. As illustrated in FIG. 3, the evaluation element recognition system according to the present embodiment includes an input apparatus 14, an analyzing apparatus, and an output apparatus 15.

The input apparatus 14 receives an input text.

The analyzing apparatus performs first recognition for the input text to obtain a first recognition result using a first conditional random field model, performs second recognition for the input text to obtain a second recognition result using a second conditional random field model, and recognizes an evaluation element in the input text based on the first recognition result and the second recognition result. The first recognition result includes a pre-evaluation element that is recognized by using the first conditional random field model. The second recognition result includes a false positive evaluation element that is recognized by using the second conditional random field model. The false positive evaluation element is an element erroneously detected as an evaluation element.

The output apparatus 15 outputs a recognition result of the analyzing apparatus.

The evaluation element recognition system according to the present embodiment may be implemented by using a computer system. As illustrated in FIG. 3, when the evaluation element recognition system is implemented by using a computer system, the analyzing apparatus includes a CPU (Central Processing Unit) 10, an RAM (Random-Access Memory) 11, an ROM (Read-Only Memory) 12, and an HDD (Hard Disk Drive) 13. The CPU 10 performs the first recognition for the input text to obtain the first recognition result using the first conditional random field model, performs the second recognition for the input text to obtain the second recognition result using the second conditional random field model, and recognizes the evaluation element in the input text based on the first recognition result and the second recognition result. An intermediate result during a calculation process may be stored in the RAM 11 and the ROM 12, and a finally obtained recognition result may be stored in the HDD 13.

In the present embodiment, the first recognition is performed for the input text using the first conditional random field model, and the pre-evaluation element is recognized from the input text. Then, the second recognition is performed for the input text using the second conditional random field model, and the false positive evaluation element is recognized from the input text. And then, the evaluation element in the input text is recognized by determining whether the pre-evaluation element is the evaluation element based on the first recognition result and the second recognition result. According to the embodiment of the present invention, it is possible to analyze a text of a user review, and to recognize the evaluation element in the text.

Fourth Embodiment

In the following, the evaluation element recognition method according to the present invention will be described in detail with reference to an example where the input text is a user review. In the present embodiment, the evaluation element is recognized using the first conditional random field model and the second conditional random field model. The first conditional random field model may preliminarily recognize an evaluation element in a text. For example, when a text input into the first conditional random field model is "the background music of this movie is amazing", the evaluation elements recognized by the first conditional random field model are "movie" and "background music". As another example, when a text input into the first conditional random field model is "an XX screen of a X mobile phone is very good and powerful", the evaluation elements recognized by the first conditional random field model are "mobile phone" and "XX screen". However, in the present embodiment, a preliminary recognition result output by the first conditional random field model is not a final recognition result; accordingly, in the present embodiment, the evaluation element recognized by the first conditional random field model is called a "pre-evaluation element". The second conditional random field model may recognize a false positive evaluation element in a text, the false positive evaluation element is an element erroneously regarded as an evaluation element. For example, when a text input into the second conditional random field model is "a high-resolution XX screen is used in an X mobile phone", the false positive evaluation element recognized by the second conditional random field model is "XX screen". The "XX screen" is not an evaluation element because there is no user's opinion in this sentence.

Figure 4:
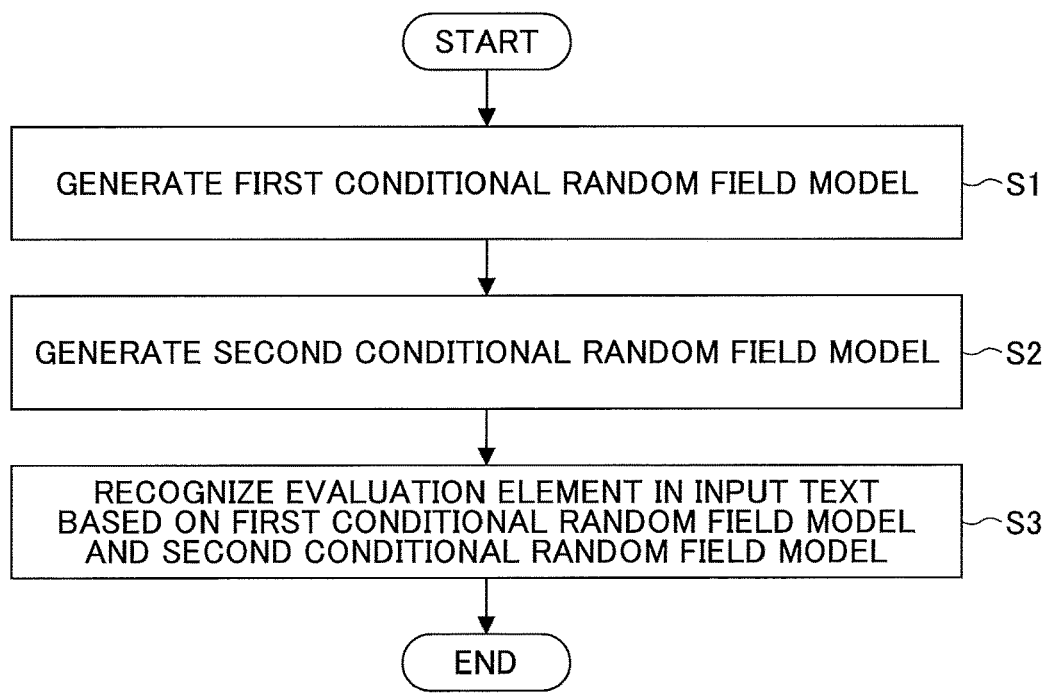
FIG. 4 is a flowchart illustrating an evaluation element recognition method according to a fourth embodiment of the present invention.

As illustrated in FIG. 4, the evaluation element recognition method according to the present embodiment specifically includes steps S1 to S3.

Step S1: generate a first conditional random field model.

Figure 5:
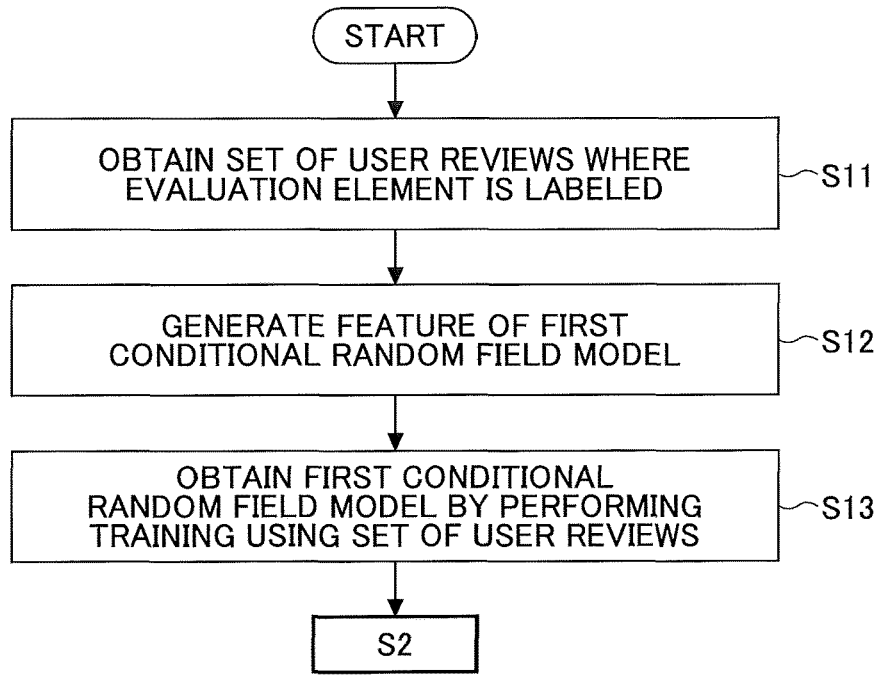
FIG. 5 is a flowchart illustrating a method of generating a first conditional random field model according to the fourth embodiment of the present invention.

Specifically, as illustrated in FIG. 5, step S1 includes steps S11 to S13.

Step S11: obtain a set of user reviews where an evaluation element is labeled.

A dictionary of elements is constructed, and an evaluation element or a non-evaluation element is labeled for all of the elements that appear in the set of user reviews. It is better if the number of user reviews in the set of user reviews is larger. In this way, a first conditional random field model with a higher recognition precision rate can be obtained by performing training using a large amount of data.

Step S12: generate a feature of the first conditional random field model.

Preferably, the feature of the first conditional random field model may be a word-level feature, because the word-level feature has a better indicating effect on subjectivity.

Step S13: obtain a first conditional random field model by performing training using the set of the user reviews.

A weight of the feature of the first conditional random field model is estimated using the set of the user reviews, and the first conditional random field model is generated based on the estimated weight. The method for estimating the weight of the feature of the first conditional random field model includes but is not limited to a maximum likelihood method, a BFGS method, a stochastic gradient descent method, and a Bayes method.

The evaluation element in the user review can be recognized by the first conditional random field model obtained in the above step. For example, when a user review input into the first conditional random field model is "I really do not like X brand", the recognition result output by the first conditional random field model is "X brand"; when a user review input into the first conditional random field model is "a reasonable price", the recognition result output by the first conditional random field model is "price"; when a user review input into the first conditional random field model is "I really like Y brand", the recognition result output by the first conditional random field model is "Y brand"; and when a user review input into the first conditional random field model is "the appearance is so cute", the recognition result output by the first conditional random field model is "appearance".

Step S2: generate a second conditional random field model.

Figure 6:
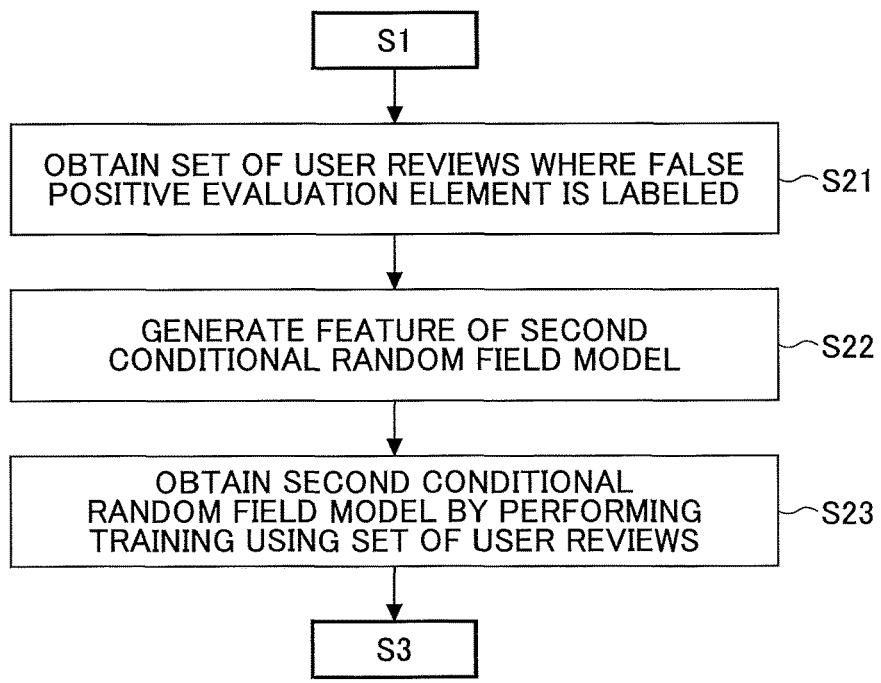
FIG. 6 is a flowchart illustrating a method of generating a second conditional random field model according to the fourth embodiment of the present invention.

Specifically, as illustrated in FIG. 6, step S2 includes steps S21 to S23.

Step S21: obtain a set of user reviews where a false positive evaluation element is labeled.

A dictionary of elements is constructed, and an evaluation element or a non-evaluation element is labeled for all of the elements that appear in the set of user reviews. If the element is not an evaluation element, the element may be labelled as a false positive evaluation element. It is better if the number of user reviews in the set of user reviews is larger. In this way, a second conditional random field model with a higher recognition precision rate can be obtained by performing training using a large amount of data.

Step S22: generate a feature of the second conditional random field model.

Preferably, the feature of the second conditional random field model may be a sentence-level feature, because the sentence-level feature has a better indicating effect on objectivity.

Step S23: obtain a second conditional random field model by performing training using the set of the user reviews.

A weight of the feature of the second conditional random field model is estimated using the set of the user reviews, and the second conditional random field model is generated based on the estimated weight. The method for estimating the weight of the feature of the second conditional random field model includes but is not limited to a maximum likelihood method, a BFGS method, a stochastic gradient descent method, and a Bayes method.

The false positive evaluation element in the user review can be recognized by the second conditional random field model obtained in the above step. For example, when a user review input into the second conditional random field model is "a high-resolution XX screen is used in an X mobile phone", the recognition result output by the second conditional random field model is "XX screen".

In step S3, an evaluation element in the input text is recognized based on the first conditional random field model and the second conditional random field model.

Figure 7:
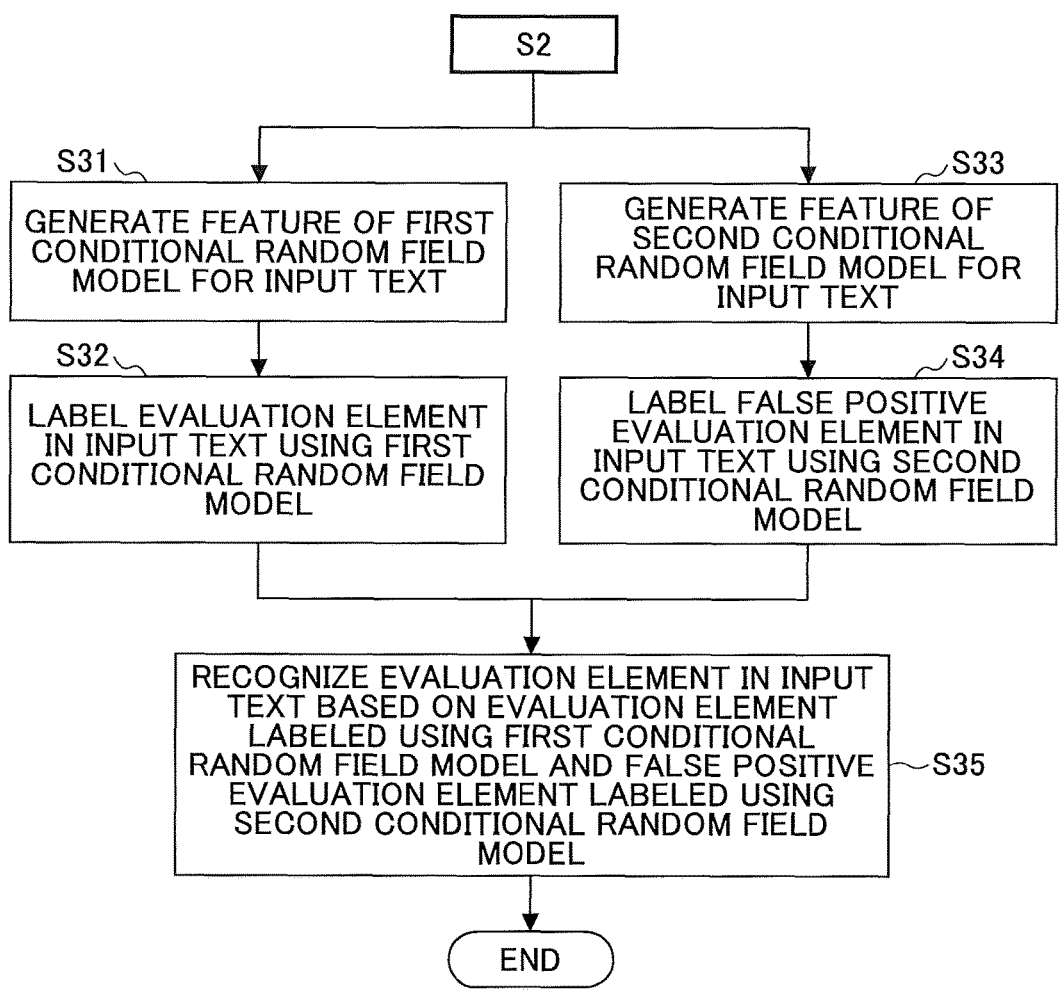
FIG. 7 is a flowchart illustrating a method of recognizing an evaluation element in an input text according to the fourth embodiment of the present invention.

As illustrated in FIG. 7, step S3 includes steps S31 to S35.

In step S31, a feature of a first conditional random field model is generated for an input text.

In step S32, an evaluation element in the input text is labeled using the first conditional random field model.

Any conventional technology, such as a Viterbi-like dynamic programming method may be used in a decoding process.

In step S33, a feature of a second conditional random field model is generated for the input text.

In step S34, a false positive evaluation element in the input text is labeled using the second conditional random field model.

Any conventional technology, such as a Viterbi-like dynamic programming method may be used in a decoding process.

In step S35, an evaluation element in the input text is recognized based on the evaluation element labeled using the first conditional random field model and the false positive evaluation element labeled using the second conditional random field model.

Specifically, it is determined that the evaluation element labeled by the first conditional random field model is an evaluation element, when the evaluation element labeled by the first conditional random field model is not a false positive evaluation element.

Furthermore, if it is determined by the first conditional random field model that a word in the input text is a non-evaluation element and it is determined by the second conditional random field model that the word is a non-false positive evaluation element, it may be determined that the word is not an evaluation element. If it is determined by the first conditional random field model that a word in the input text is a non-evaluation element and it is determined by the second conditional random field model that the word is a false positive evaluation element, it may be determined that the word is not an evaluation element.

Furthermore, a marginal probability that a word in the input text is labeled as an evaluation element by the first conditional random field model is p1, and a marginal probability that the word is labeled as a false positive evaluation element by the second conditional random field model is p2. It is determined that the evaluation element labeled by the first conditional random field model is an evaluation element, when a ratio between p1 and p2 is greater than a predetermined threshold; and it is determined that the evaluation element labeled by the first conditional random field model is not an evaluation element, when the ratio between p1 and p2 is not greater than the predetermined threshold.

For example, for a user review "a powerful high-resolution XX screen is used in an X mobile phone", the user review may be divided into words "powerful", "high-resolution", "XX screen", "is used in" and "X mobile phone". The first conditional random field model is used to label the words as evaluation elements or not, and the second conditional random field model is used to label the words as false positive evaluation elements or not. When the word "X mobile phone" is not labeled as an evaluation element by the first conditional random field model and the word "X mobile phone" is not labeled as a false positive evaluation element by the second conditional random field model, it may be finally determined that the word "X mobile phone" is not an evaluation element. When the word "is used in" is not labeled as an evaluation element by the first conditional random field model and the word "is used in" is not labeled as a false positive evaluation element by the second conditional random field model, it may be finally determined that the word "is used in" is not an evaluation element. When the word "powerful" is not labeled as an evaluation element by the first conditional random field model and the word "powerful" is not labeled as a false positive evaluation element by the second conditional random field model, it may be finally determined that the word "powerful" is not an evaluation element. When the word "high-resolution" is not labeled as an evaluation element by the first conditional random field model and the word "high-resolution" is not labeled as a false positive evaluation element by the second conditional random field model, it may be finally determined that the word "high-resolution" is not an evaluation element. When the word "XX screen" is labeled as an evaluation element by the first conditional random field model and a marginal probability is p1, and the word "XX screen" is labeled as a false positive evaluation element by the second conditional random field model and a marginal probability is p2; accordingly, it may be finally determined that the word "XX screen" is an evaluation element when a ratio between p1 and p2 is greater than a predetermined threshold, and it may be finally determined that the word "XX screen" is not an evaluation element when the ratio between p1 and p2 is not greater than the predetermined threshold.

In the present embodiment, the first recognition is performed for the input text using the first conditional random field model, and the pre-evaluation element is recognized from the input text. Then, the second recognition is performed for the input text using the second conditional random field model, and the false positive evaluation element is recognized from the input text. And then, the evaluation element in the input text is recognized by determining whether the pre-evaluation element is the evaluation element based on the first recognition result and the second recognition result. According to the embodiment of the present invention, it is possible to analyze a text of a user review, and to recognize the evaluation element in the text.

In the present specification, many described functional components are called modules, so as to particularly emphasize the independence of their implementation methods.

In the embodiments of the present invention, the modules may be implemented by software that can be executed by any type of processor. For example, a marked executable code module may include one or more physical or logic blocks of computer commands, and may be constructed as, for example, an object, a process, or a function. Nevertheless, the executable code of the marked module does not need to be physically located together, but may include different commands stored in different physical blocks. When these commands are logically combined, the commands configure the module and realize intended purposes of the module.

In practice, the executable code module may be a single command or a plurality of commands, and may be distributed in different code sections, different programs, and a plurality of memory apparatuses. Similarly, operation data may be identified in the module and may be implemented according to any suitable form and be incorporated into any suitable type of data structure. The operation data may be collected as a single data set or may be distributed in different locations (including different storage apparatuses), and at least some of them may exist in a system or a network as electronic signals only.

The units or module may also implemented by software. When considering the level of conventional hardware technology, the unit or module may be implemented by software; and when not considering the level of conventional hardware technology, a person skilled in the art may construct corresponding hardware circuits to implement corresponding functions. The hardware circuits include conventional very large scale integration (VLSI) circuits or a gate array, and conventional semiconductor or other separated components such as logical chips, transistors or the like. The module may also be implemented by a programmable hardware equipment, such as a field programmable gate array, a programmable gate array logic, a programmable logic equipment or the like.

In the embodiments of the present invention, a sequential order of the steps is not limited to the number of the steps, and the sequential order of the steps may be changed by a person skilled in the art.

The present invention is not limited to the specifically disclosed embodiments, and various modifications, combinations and replacements may be made without departing from the scope of the present invention.

What is claimed is:

1. An evaluation element recognition method comprising:
   receiving an input text;
   performing, using a first conditional random field model, first recognition for the input text to obtain a first recognition result, the first recognition result including a pre-evaluation element that is recognized by using the first conditional random field model;
   performing, using a second conditional random field model, second recognition for the input text to obtain a second recognition result, the second recognition result including a false positive evaluation element that is recognized by using the second conditional random field model, the false positive evaluation element being an element erroneously detected as an evaluation element; and
   recognizing, based on the first recognition result and the second recognition result, an evaluation element in the input text,
   wherein the first recognition result further includes a marginal probability p1 of the pre-evaluation element that is recognized by using the first conditional random field model, and the second recognition result further includes a marginal probability p2 of the false positive evaluation element that is recognized by using the second conditional random field model, and
   wherein the recognizing includes
   determining that the pre-evaluation element is an evaluation element, when a ratio between p1 and p2 is greater than a predetermined threshold, and determining that the pre-evaluation element is not an evaluation element, when the ratio between p1 and p2 is not greater than the predetermined threshold.

2. The evaluation element recognition method according to claim 1,
   wherein before performing the first recognition for the input text using the first conditional random field model, the evaluation element recognition method further includes
   obtaining a plurality of sets of first training data, each set of the first training data including a text and an evaluation element labeled in the text;
   generating a feature of the first conditional random field model; and
   estimating, using the plurality of sets of first training data, a weight of the feature of the first conditional random field model, and generating, based on the estimated weight, the first conditional random field model.

3. The evaluation element recognition method according to claim 2,
   wherein the feature of the first conditional random field model is a word-level feature.

4. The evaluation element recognition method according to claim 1,
   wherein before performing the second recognition for the input text using the second conditional random field model, the evaluation element recognition method further includes
   obtaining a plurality of sets of second training data, each set of the second training data including a text and a false positive evaluation element labeled in the text;
   generating a feature of the second conditional random field model; and
   estimating, using the plurality of sets of second training data, a weight of the feature of the second conditional random field model, and generating, based on the estimated weight, the second conditional random field model.

5. The evaluation element recognition method according to claim 4,
   wherein the feature of the second conditional random field model is a sentence-level feature.

6. The evaluation element recognition method according to claim 1,
   wherein recognizing the evaluation element in the input text based on the first recognition result and the second recognition result includes
   determining that the pre-evaluation element is an evaluation element, when the pre-evaluation element is not the false positive evaluation element.

7. An evaluation element recognition apparatus comprising:
   a memory storing computer-readable instructions; and
   one or more processors configured to execute the computer-readable instructions such that the one or more processors are configured to
   receive an input text;
   perform, using a first conditional random field model, first recognition for the input text to obtain a first recognition result, the first recognition result including a pre-evaluation element that is recognized by using the first conditional random field model;
   perform, using a second conditional random field model, second recognition for the input text to obtain a second recognition result, the second recognition result including a false positive evaluation element that is recognized by using the second conditional random field model, the false positive evaluation element being an element erroneously detected as an evaluation element; and
   recognize, based on the first recognition result and the second recognition result, an evaluation element in the input text,
   wherein the first recognition result further includes a marginal probability p1 of the pre-evaluation element that is recognized by using the first conditional random field model, and the second recognition result further includes a marginal probability p2 of the false positive evaluation element that is recognized by using the second conditional random field model, and wherein the one or more processors are further configured to determine that the pre-evaluation element is an evaluation element, when a ratio between p1 and p2 is greater than a predetermined threshold, and determining that the pre-evaluation element is not an evaluation element, when the ratio between p1 and p2 is not greater than the predetermined threshold.

8. The evaluation element recognition apparatus according to claim 7,
wherein before performing the first recognition for the input text using the first conditional random field model, the one or more processors are further configured to
obtain a plurality of sets of first training data, each set of the first training data including a text and an evaluation element labeled in the text;
generate a feature of the first conditional random field model; and
estimate, using the plurality of sets of first training data, a weight of the feature of the first conditional random field model, and generating, based on the estimated weight, the first conditional random field model.

9. The evaluation element recognition apparatus according to claim 7,
wherein before performing the second recognition for the input text using the second conditional random field model, the one or more processors are further configured to
obtain a plurality of sets of second training data, each set of the second training data including a text and a false positive evaluation element labeled in the text;
generate a feature of the second conditional random field model; and
estimate, using the plurality of sets of second training data, a weight of the feature of the second conditional random field model, and generating, based on the estimated weight, the second conditional random field model.

10. An evaluation element recognition system comprising:
an input apparatus configured to receive an input text;
an analyzing apparatus; and
an output apparatus configured to output a recognition result of the analyzing apparatus,
wherein the analyzing apparatus includes
a memory storing computer-readable instructions; and
one or more processors configured to execute the computer-readable instructions such that the one or more processors are configured to
perform, using a first conditional random field model, first recognition for the input text to obtain a first recognition result, the first recognition result including a pre-evaluation element that is recognized by using the first conditional random field model;
perform, using a second conditional random field model, second recognition for the input text to obtain a second recognition result, the second recognition result including a false positive evaluation element that is recognized by using the second conditional random field model, the false positive evaluation element being an element erroneously detected as an evaluation element; and
recognize, based on the first recognition result and the second recognition result, an evaluation element in the input text
wherein the first recognition result further includes a marginal probability p1 of the pre-evaluation element that is recognized by using the first conditional random field model, and the second recognition result further includes a marginal probability p2 of the false positive evaluation element that is recognized by using the second conditional random field model, and
wherein the one or more processors are further configured to determine that the pre-evaluation element is an evaluation element, when a ratio between p1 and p2 is greater than a predetermined threshold, and determining that the pre-evaluation element is not an evaluation element, when the ratio between p1 and p2 is not greater than the predetermined threshold.

* * * * *

UNITED STATES PATENT AND TRADEMARK OFFICE
CERTIFICATE OF CORRECTION

PATENT NO. : 10,282,420 B2
APPLICATION NO. : 15/597501
DATED : May 7, 2019
INVENTOR(S) : Shanshan Jiang et al.

Page 1 of 1

It is certified that error appears in the above-identified patent and that said Letters Patent is hereby corrected as shown below:

On the Title Page

Item (30), Foreign Application Priority Data:
Please correct:
201610346263
To:
201610346263.7

Signed and Sealed this
Sixteenth Day of July, 2019

Andrei Iancu
*Director of the United States Patent and Trademark Office*